US008663827B2

(12) United States Patent
Park et al.

(10) Patent No.: US 8,663,827 B2
(45) Date of Patent: Mar. 4, 2014

(54) BATTERY PACK

(75) Inventors: Kyung-Ho Park, Suwon-si (KR); Seok Koh, Suwon-si (KR); Young-Ho Kim, Suwon-si (KR); Jeong-Deok Byun, Suwon-si (KR); Kyung-Won Seo, Suwon-si (KR)

(73) Assignee: Samsung SDI Co., Ltd., Yongin-si, Gyeonggi-do (KR)

( * ) Notice: Subject to any disclaimer, the term of this patent is extended or adjusted under 35 U.S.C. 154(b) by 671 days.

(21) Appl. No.: 12/436,664

(22) Filed: May 6, 2009

(65) Prior Publication Data
US 2009/0280398 A1 Nov. 12, 2009

(30) Foreign Application Priority Data
May 9, 2008 (KR) .................. 10-2008-0043307

(51) Int. Cl.
*H01M 2/10* (2006.01)
*H01M 2/28* (2006.01)

(52) U.S. Cl.
USPC .......................................... 429/100; 429/121

(58) Field of Classification Search
USPC .................................................. 429/100, 121
See application file for complete search history.

(56) References Cited

U.S. PATENT DOCUMENTS

2008/0292955 A1* 11/2008 Byun et al. .................... 429/163

FOREIGN PATENT DOCUMENTS

| JP | 2004-071345 | 3/2004 | | |
|---|---|---|---|---|
| JP | 2005-346964 | 12/2005 | | |
| JP | 2005346964 A | * 12/2005 | ........... H01M 2/10 |
| JP | 2006-004783 | 1/2006 | | |
| JP | 2007-157452 | 6/2007 | | |
| KR | 20-0406606 | 1/2006 | | |
| KR | 1020060032591 | 4/2006 | | |
| KR | 100685115 | 2/2007 | | |
| KR | 100685115 B1 | * 2/2007 | ........... H01M 2/02 |

OTHER PUBLICATIONS

Office Action of Nov. 27, 2009 from corresponding application KR 10-2008-0043307.
Notice of Allowance for corresponding Korean Patent Application No. 10-2008-0043307.

* cited by examiner

*Primary Examiner* — Karie O'Neill Apicella
(74) *Attorney, Agent, or Firm* — Knobbe, Martens, Olson & Bear, LLP (57) ABSTRACT

Provided is a battery pack, which can increase coupling force between a holder and a protection circuit board, and improve processability and productivity. The battery pack includes a bare cell, a holder disposed at one side of the bare cell and having a first fastening part, and a protection circuit assembly disposed at one side of the holder and having a second fastening part coupled to the first fastening part, wherein one of the first and second fastening parts is a protrusion and the other is a groove, and the protrusion includes a first supporting surface, a second supporting surface and a notch formed between the first and second supporting surfaces. Also, the battery pack includes a bare cell, a holder disposed at one side of the bare cell and having a first fastening part, and a protection circuit assembly disposed at one side of the holder and having a second fastening part coupled to the first fastening part, wherein the first fastening part is a first protrusion and the second fastening part is a second protrusion, and one of the first and second protrusions includes a first supporting surface, a second supporting surface and a notch formed between the first and second supporting surfaces and the other is formed in the shape of a square pillar.

14 Claims, 10 Drawing Sheets

BATTERY PACK

CROSS-REFERENCE TO RELATED APPLICATION

This application claims the benefit of Korean Patent Application No. 2008-0043307, filed May 9, 2008, the disclosure of which is hereby incorporated herein by reference in its entirety.

BACKGROUND OF THE INVENTION

1. Field of the Invention

The present invention relates to a battery pack, and more particularly, to a battery pack which can increase coupling force between a holder and a protection circuit board, and improve processability and productivity.

2. Description of the Related Art

Secondary batteries are rechargeable and can be repeatedly used. Thus, the secondary batteries are more economical than disposable batteries.

Also, the secondary batteries can realize high capacity with small volume, and thus are used as a driving power source for handheld electric devices such as mobile phones, MP3 players, notebook computers and digital cameras.

The secondary batteries are also used in high power products such as hybrid cars and electric tools as well as handheld electrical appliances.

The secondary batteries include, for example, nickel-cadmium batteries, nickel-zinc batteries, nickel-metal hydride batteries and lithium secondary batteries.

The lithium secondary batteries are widely used because they are compact, and provide high capacity, high operating voltages and high energy density per unit weight.

The lithium secondary batteries are formed by accommodating an electrode assembly and an electrolyte in a casing and sealing the casing, which is called a bare cell.

The lithium secondary batteries may be classified into a can type and a pouch type depending on the shape of the casing, and the can-type batteries may be classified into a square type and a cylindrical type.

The bare cell is electrically connected with a protection circuit board to prevent hazards caused by abnormal operations such as overcharge, overdischarge and overcurrent.

The protection circuit board is formed by mounting protection circuits such as a PTC thermistor, a protection circuit, a fuse and a temperature sensor on a printed circuit board.

The bare cell and the protection circuit board are formed in the shape of a battery pack, which may be a hard pack type in which the secondary battery and the protection circuit board are accommodated in a separate casing.

Or, the battery pack may be an inner pack type in which the protection circuit board is covered with a cover and the exterior is tubed and labeled.

The battery pack may include a fixing mechanism (hereinafter, a holder) between the bare cell and the protection circuit board, which has a specific shape capable of coupling the protection circuit board and can maintain a distance between the bare cell and the protection circuit board.

When the protection circuit board is coupled to the holder, a coupling protrusion formed on the holder is inserted into a coupling groove formed in the protection circuit board.

In fabrication of the protection circuit board and the holder, a size difference between the coupling protrusion and the coupling groove can occur due to assembly deviation.

However, since the coupling protrusion is formed in a prismatic shape having a fixed size in the conventional art, a mold may have to be adjusted to address the mismatch between the protrusion and groove.

Thus, an unnecessary process may have to be performed due to the mold adjustment thereby increasing manufacturing costs.

SUMMARY OF THE INVENTION

Aspects of the present invention provide a battery pack which can increase coupling force between a holder and a protection circuit board, and improve processability and productivity.

According to an embodiment of the present invention, a battery pack includes: a bare cell; a holder disposed at one side of the bare cell and having a first fastening part; and a protection circuit assembly disposed at one side of the holder, and having a second fastening part coupled to the first fastening part, wherein one of the first and second fastening parts is a protrusion and the other is a groove, and the protrusion includes a first supporting surface, a second supporting surface and a notch formed between the first and second supporting surfaces.

According to another embodiment of the present invention, a battery pack includes: a bare cell; a holder disposed at one side of the bare cell and having a first fastening part; and a protection circuit assembly disposed at one side of the holder, and having a second fastening part coupled to the first fastening part, wherein the first fastening part is a first protrusion and the second fastening part is a second protrusion, and one of the first and second protrusions includes a first supporting surface, a second supporting surface and a notch formed between the first and second supporting surfaces and the other is formed in a square pillar shape.

According to still another embodiment of the present invention, a battery pack includes: a bare cell, a holder disposed at one side of the bare cell and having a first fastening part, and a protection circuit assembly disposed at one side of the holder and having a second fastening part, wherein one of the first and second fastening parts is a protrusion including a first supporting surface, a second supporting surface and a notch formed between the first and second supporting surfaces.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE INVENTION

Reference will now be made in detail to the present embodiments of the present invention, examples of which are illustrated in the accompanying drawings, wherein like reference numerals refer to like elements throughout. The embodiments are described below in order to explain the present invention by referring to the figures.

Figure 1A:
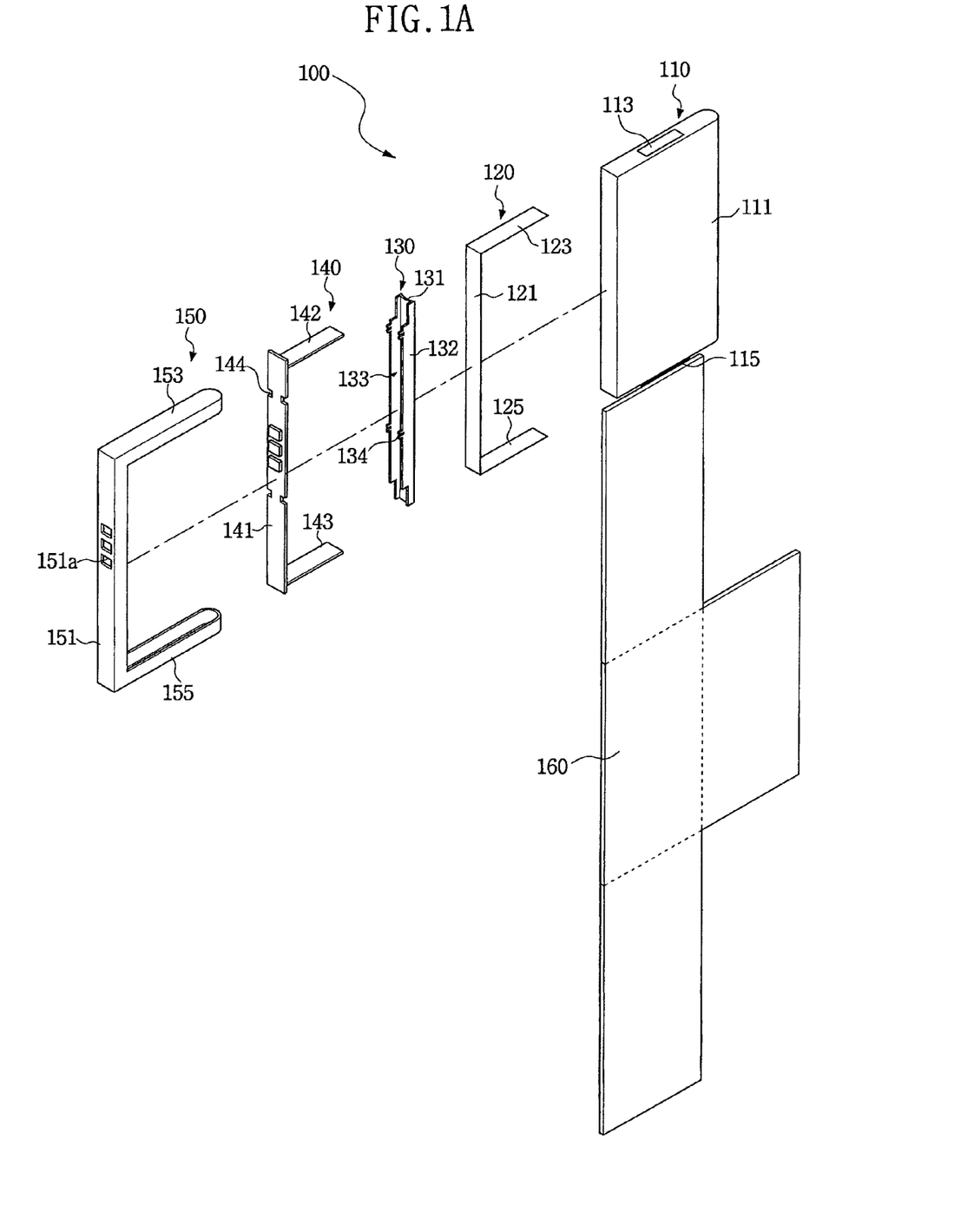
FIG. 1A is an exploded perspective view of a battery pack according to a first exemplary embodiment of the present invention.
Figure 1B:
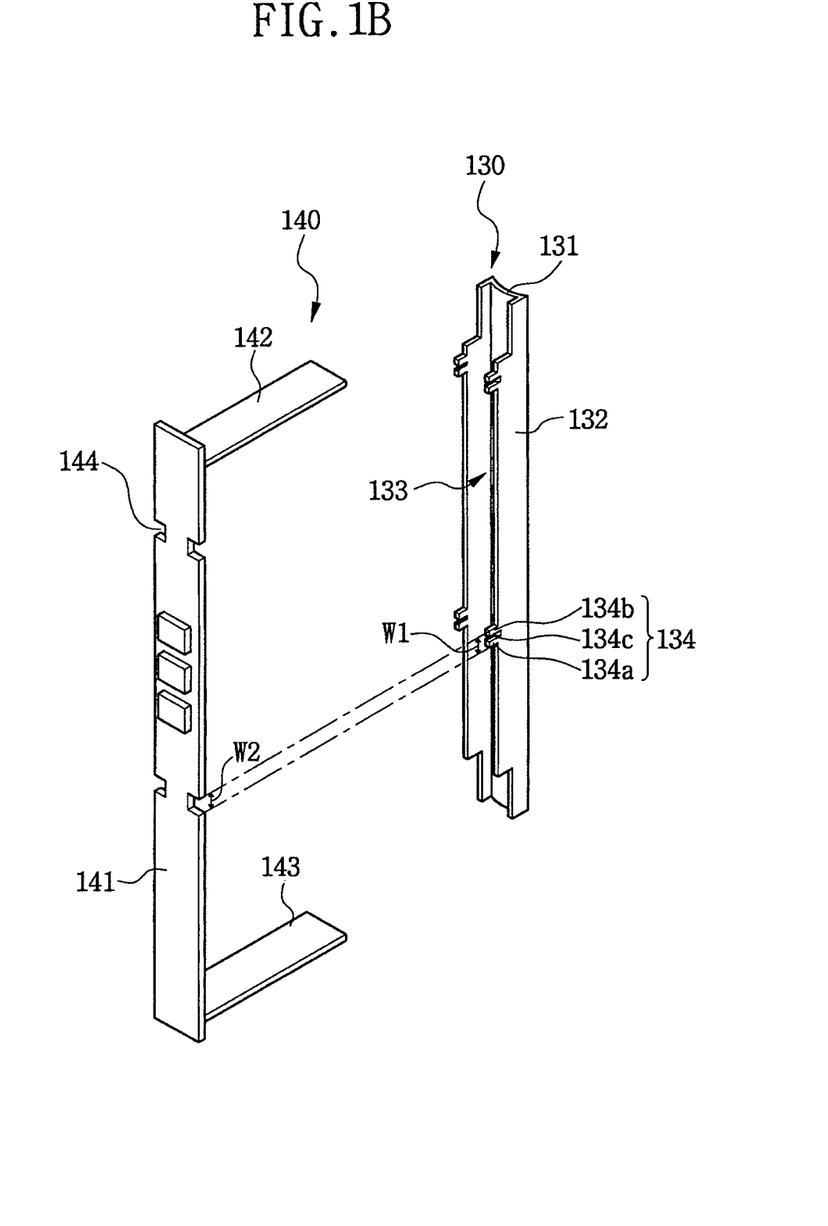
FIG. 1B is a perspective view before coupling a holder to a protection circuit assembly of FIG. 1A.

FIG. 1A is an exploded perspective view of a battery pack according to a first exemplary embodiment of the present invention, and FIG. 1B is a perspective view before coupling a holder to a protection circuit assembly of FIG. 1A.

Referring to FIGS. 1A and 1B, a battery pack 100 according to the first exemplary embodiment of the present invention includes a bare cell 110, a holder 130 and a protection circuit assembly 140.

The battery pack 100 may also include an insulating member 120 disposed between the bare cell 110 and the holder 130, a cover 150 disposed on the protection circuit assembly 140, and a casing 160 for tubing or labeling.

The bare cell 110 includes a can 111 having an opening at one side, and a cap assembly coupled to the opening.

The bare cell 110 accommodates an electrode assembly and an electrolyte in the can 111, and the electrode assembly may be formed in a jelly-roll type in which a positive electrode plate, a negative electrode plate and a separator are stacked and wound.

The can 111 may be formed of a metal such as aluminum or an aluminum alloy by deep drawing.

Further, the can 111 may be formed in a prismatic shape or a pillar shape having rounded corners.

A first electrode terminal 113 is formed on a first surface of the bare cell 110, and a second electrode terminal 115 is formed on a second surface thereof.

Hereinafter, the first electrode terminal 113 is called a negative electrode terminal, and a second electrode terminal 115 is called a positive electrode terminal.

Further, the first surface having the first electrode terminal 113 is called a top surface of the bare cell 110, and the second surface having the second electrode terminal 115 is a bottom surface of the bare cell 110.

Depending on the forming process of the bare cell 110, the can 111 can serve as a positive electrode terminal, and an electrode plate attached to one surface of the can 111 can serve as a positive electrode terminal.

In the present embodiment, the electrode plate 115 serves as a positive electrode terminal, and thus is disposed on the bottom surface of the bare cell 110.

However, depending on the forming process of an electrode terminal, the polarity may be converted.

The electrode plate 115 may have a clad metal structure formed of an aluminum layer and a metal layer, and the aluminum layer is attached to the bottom surface of the bare cell 110 by ultrasonic welding.

The negative electrode terminal 113 is connected with a first lead terminal 142 of the protection circuit assembly 140, and a nickel layer of the electrode plate 115 is connected with a second lead terminal 143 of the protection circuit assembly 140.

The insulating member 120 may be disposed between the bare cell 110 and the holder 130, between the bare cell 110 and the first lead terminal 142 and between the bare cell 110 and the second lead terminal 143.

The insulating member 120 has an adhesive property, and thus may be an insulating double-sided adhesive tape to prevent a short circuit between the terminals having different polarities from each other.

To be specific, the insulating member 120 may include a side surface 121 formed to cover one side surface of the bare cell 110, and top and bottom surfaces 123 and 125 extending to the top and bottom of the bare cell 110 from the side surface 121.

The top surface 123 covers a top surface of the bare cell 110, and the bottom surface 125 covers a bottom surface of the bare cell 110.

The side surface 121 is disposed at a side surface of the bare cell 110 contacting the holder 130, and can improve coupling force between the holder 130 and the bare cell 110.

The top surface 123 may completely cover the top surface of the bare cell 110 except the negative electrode terminal 113 of the bare cell 110.

Alternatively, the top surface 123 may partially cover the top surface of the bare cell 110 along a path of the first lead terminal 142 of the protection circuit assembly 140 connected with the negative electrode terminal 113.

Due to the adhesive property of the insulating member 120, the first lead terminal 142 is in close contact with the top surface of the bare cell 110 and is connected with the negative electrode terminal 113, so it cannot be easily separated.

However, the top surface 123 may not be formed when there is no risk of a short circuit between the first lead terminal 142 and the can 111 due to a washer disposed on the top surface of the bare cell 110.

The bottom surface 125 may partially cover the bottom surface of the bare cell 110 along a path of the second lead terminal 143 of the protection circuit assembly 140 connected with the positive electrode terminal 115 of the bare cell 110.

The bottom surface 125 brings the second lead terminal 143 into contact with the bare cell 110.

The bottom surface 125 may completely cover the bottom surface of the bare cell 110 except the electrode plate 115.

However, the bottom surface 125 may not be formed when the second lead terminal 143 is welded close to an edge of a bottom surface of the can 111, so that the contact between the second lead terminal 143 and the bare cell 110 is not taken into account.

The holder 130 may be disposed at one side of the bare cell 110, has a shape in which the protection circuit assembly 140 can be seated, and is formed of plastic in one embodiment.

To be specific, the holder 130 may include a flat seating part 131 disposed at one side of the bare cell 110, supports 132 formed perpendicular to the flat seating part 131 along edges of longer sides thereof, and a holding part 133 which is an empty space surrounded by the flat seating part 131 and the supports 132.

Further, the holder 130 includes at least one protrusion 134 as a first fastening part, and the protrusion 134 is coupled to a groove 144 as a second fastening part of the protection circuit assembly 140, which will be described later.

The protrusion 134 may project from a part of an edge of the support 132.

The protrusion 134 includes first and second supporting surfaces 134a and 134b, and a notch 134c formed therebetween.

A width (W1) of the protrusion 134 may be the same as a width (W2) of the groove 144.

Alternatively, because the first and second supporting surfaces 134a and 134b can be bent inward toward the notch 134c, even if the width (W1) of the protrusion 134 is larger than that of the groove 144, the protrusion 134 can be coupled to the groove 144 with the first and second supporting surfaces 134a and 134b bent inward toward the notch 134c.

However, when the width (W1) of the protrusion 134 is too large, the first and second supporting surfaces 134a and 134b may be damaged while being coupled to the groove 144.

When the width (W1) of the protrusion 134 is smaller than the width (W2) of the groove 144, the protrusion 134 can be smoothly coupled to the groove 144.

However, when the width (W1) of the protrusion 134 is too small, the protrusion 134 may be easily moved or separated in response to small impact due to weak coupling force, even though the protrusion 134 is coupled to the groove 144.

The protection circuit assembly 140 is disposed at one side of the holder 130, and includes a protection circuit board 141, which is formed by mounting a protection circuit, an electrical device such as a PTC thermistor and an external connection terminal on a printed circuit board, a first lead terminal 142 and a second lead terminal 143.

The first and second lead terminals 142 and 143 are electrically connected with the protection circuit board 141.

The protection circuit stops current flow by shorting an internal circuit when abnormal operations such as overcharge, overdischarge and overcurrent occur, and thus prevents combustion or explosion of a battery.

The protection circuit board 141 is coupled to the holder 130, and includes at least one opening or groove 144 as a second fastening part, formed to be coupled to the protrusion 134 of the holder 130.

Thus, the grooves 144 may be formed corresponding to the protrusions 134, and formed at both longer sides of the protection circuit board 141.

Table 1 shows possibilities of assembly and coupling forces between the first fastening part 134 formed at the hole 130 and the second fastening part 144 formed at the protection circuit board according to a variety in width of the first fastening part.

TABLE 1

| Cycle | Width (mm) of second fastening part | Width (mm) of first fastening part | Possibility of assembly | Coupling force |
|---|---|---|---|---|
| 1 | 0.98 | 0.90 | o | x |
| 2 | 0.98 | 0.91 | o | o |
| 3 | 0.98 | 0.91 | o | o |
| 4 | 0.98 | 0.90 | o | x |
| 5 | 0.98 | 0.92 | o | ○ |
| 6 | 0.98 | 0.93 | o | ○ |
| 7 | 0.98 | 0.94 | o | ○ |
| 8 | 0.98 | 0.95 | o | ○ |
| 9 | 0.98 | 0.96 | o | ○ |
| 10 | 0.98 | 0.97 | o | ○ |
| 11 | 0.98 | 0.98 | o | ○ |
| 12 | 0.98 | 0.99 | o | ○ |
| 13 | 0.98 | 1.00 | o | ○ |
| 14 | 0.98 | 1.01 | o | ○ |
| 15 | 0.98 | 1.02 | o | ○ |
| 16 | 0.98 | 1.03 | o | ○ |
| 17 | 0.98 | 1.04 | o | ○ |
| 18 | 0.98 | 1.05 | o | ○ |
| 19 | 0.98 | 1.06 | o | ○ |
| 20 | 0.98 | 1.07 | o | ○ |
| 21 | 0.98 | 1.06 | o | ○ |
| 22 | 0.98 | 1.07 | o | ○ |
| 23 | 0.98 | 1.07 | o | ○ |
| 24 | 0.98 | 1.06 | o | ○ |
| 25 | 0.98 | 1.07 | o | ○ |
| 26 | 0.98 | 1.08 | x | X |
| 27 | 0.98 0.98 | 1.08 | x | X |

Table 1 shows possibilities of assembly and coupling forces between the first and second fastening parts according to a variety in width of the first fastening part while the width of the second fastening part is maintained constant.

In Table 1, 'O' in the "Possibility of assembly" column means that both fastening parts are assembled together, and 'O' in the "Coupling force" column means that both fastening parts are fixed together with sufficient coupling force.

Contrarily, 'X' in the "Possibility of assembly" column means that a first fastening part is damaged, and 'X' in the "Coupling force" column means that fastening parts are not fixed together and are thus movable.

As can be seen from Table 1, when the width of the first fastening part is about 92% of that of the second fastening part, i.e., 0.90 mm, they can be assembled together but the coupling force between them is weak.

However, when the width of the first fastening part is about 93% of that of the second fastening part, i.e., 0.91 mm, they can be assembled together and the coupling force between them is also good.

When the coupling force is not good, the first and second fastening parts can be separated in response to small impact. For this reason, the width of the first fastening part may be larger than 93% of that of the second fastening part.

Further, when the width of the first fastening part is about 110% of that of the second fastening part, i.e., 1.08 mm, the first fastening part can be damaged, and cannot be fixed to the second fastening part, which means it is movable.

However, when the width of the first fastening part is about 109% of that of the second fastening part, i.e., 1.07 mm, they can be assembled, and the coupling force between them is good.

Thus, the width of the first fastening part may be 109% or less of that of the second fastening part.

Of course, the present invention is not limited to the widths of the first and second fastening parts presented in the present embodiment, which will be changed according to materials and thicknesses of the first and second fastening parts.

The first and second lead terminals 142 and 143 are provided to electrically connect the protection circuit board 141 with the bare cell 110.

The first lead terminal 142 is connected with the negative electrode terminal 113 of the bare cell 110, and the second lead terminal 143 is connected with the electrode plate 115 of the bare cell 110.

If the can 111 serves as an electrode terminal instead of the electrode plate 115, the second lead terminal 143 is connected with the can 111.

The cover 150 includes a side cover 151, and top and bottom covers 153 and 155, which extend toward the top and bottom of the bare cell 110, respectively.

The side cover 151 includes a terminal hole 151a for covering the top of the protection circuit board 141 and exposing the external connection terminal formed on the protection circuit board 141 to the outside.

The top cover 153 covers the top surface of the bare cell 110 having the first lead terminal 142, and the bottom cover 155 covers the bottom surface of the bare cell 110 having the second lead terminal 143.

The side cover 151, the top cover 153 and the bottom cover 155 may be integrally formed, and the cover 150 may be forcefully coupled to the bare cell 110 attached to the protection circuit assembly 140.

After coupling the cover 150 to the bare cell 110, the bare cell 100 may further include a casing 160.

The casing 160 may be a tape-shaped label or a heat shrinkable tube, which is attached to cover the top, bottom and side surfaces of the bare cell 110.

Figure 2A:
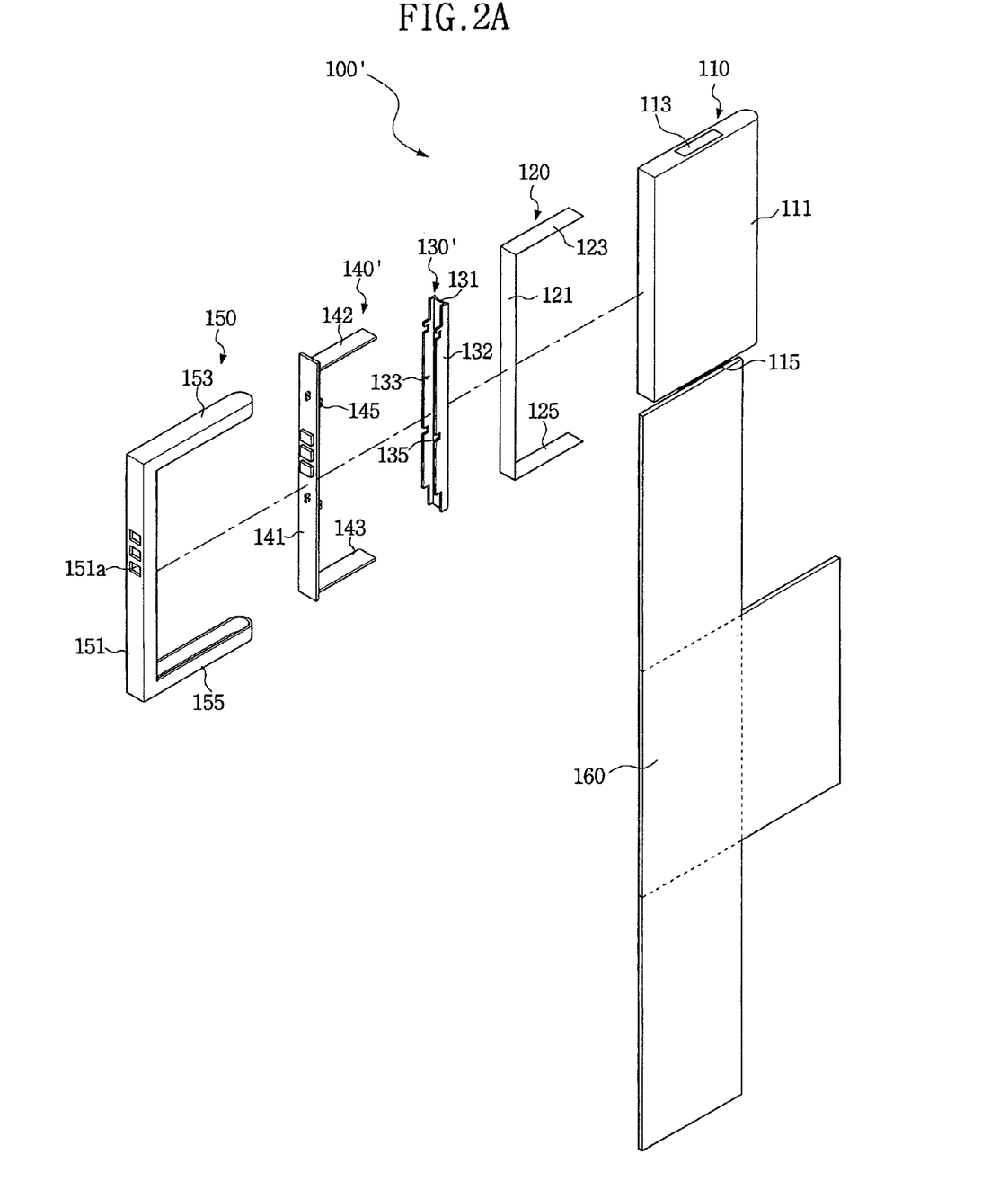
FIG. 2A is an exploded perspective view of a battery pack according to a second exemplary embodiment of the present invention.
Figure 2B:
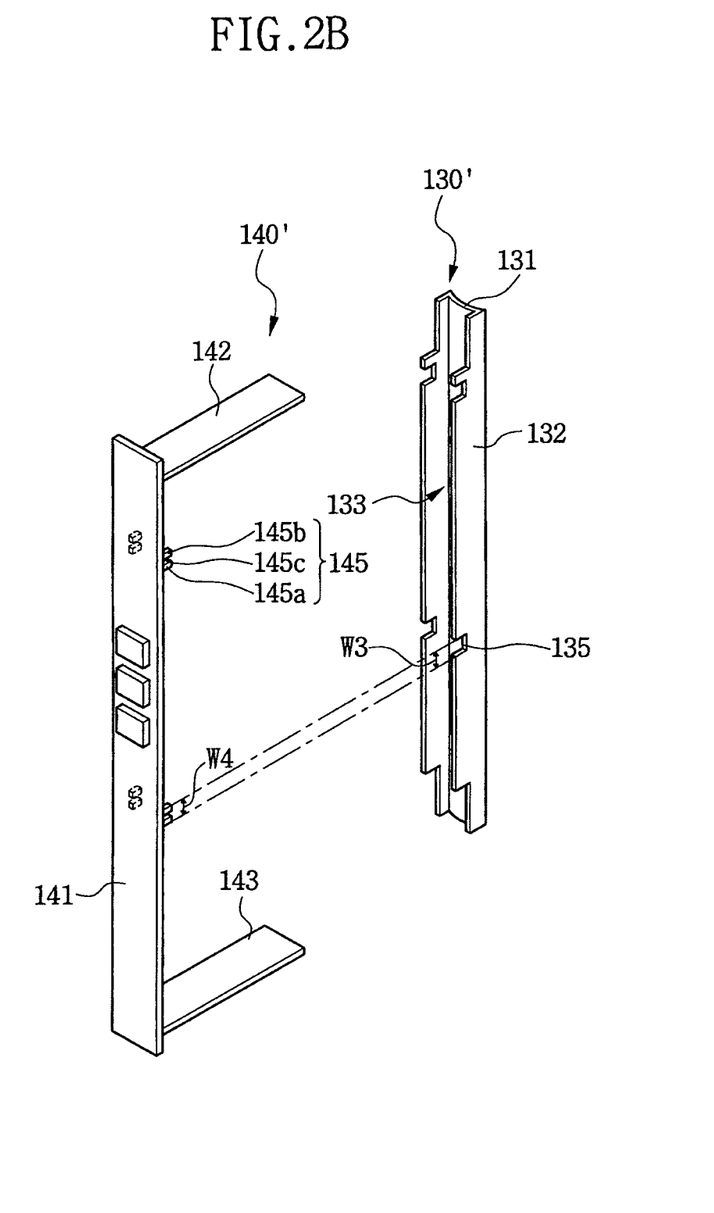
FIG. 2B is a perspective view before coupling a holder to a protection circuit assembly of FIG. 2A.

FIG. 2A is an exploded perspective view of a battery pack according to a second exemplary embodiment of the present invention, and FIG. 2B is a perspective view before coupling a holder to a protection circuit board of FIG. 2A.

Referring to FIGS. 2A and 2B, a battery pack 100' according to the second exemplary embodiment of the present invention includes a bare cell 110, a holder 130' and a protection circuit assembly 140'.

The battery pack 100' may further include an insulating member 120 disposed between the bare cell 110 and the holder 130', a cover 150 disposed on the protection circuit assembly 140', and a casing 160 for tubing or labeling.

In the battery pack 100' according to the second exemplary embodiment of the present invention, the bare cell 110, the insulating member 120, the cover 150 and the casing 160 have the same configurations and functions as those in the battery pack 100 according to the first exemplary embodiment of the present invention, and thus detailed descriptions thereof will be omitted herein.

The holder 130' may be disposed at one side of the bare cell 110, has a shape in which the protection circuit assembly 140' can be seated, and formed of plastic.

To be specific, the holder 130' may include a flat seating part 131 disposed at one side of the bare cell 110, supports 132 formed perpendicular to the flat seating part 131 along edges of longer sides thereof, and a holding part 133, which is an empty space surrounded by the flat seating part 131 and the supports 132.

The holder 130' includes at least one opening or groove 135 as a first fastening part, and the groove 135 is coupled to a protrusion 145 as a second fastening part of the protection circuit assembly 140' to be described later.

The groove 135 may be formed by recessing a part of an end of the support 132.

The protection circuit assembly 140' is disposed at one side of the holder 130', and includes a protection circuit board 141 formed by mounting a protection circuit, an electrical device such as a PTC thermistor and an external connection terminal on a printed circuit board, a first lead terminal 142 and a second lead terminal 143.

The first and second lead terminals 142 and 143 are electrically connected with the protection circuit board 141.

The first and second lead terminals 142 and 143 have the same functions as those in the first exemplary embodiment of the present invention, and thus detailed descriptions thereof will be omitted herein.

The protection circuit board 141 is coupled to the holder 130', and includes one or more protrusions 145, which are second fastening parts formed to be coupled to the grooves 135 of the holder 130'.

Thus, the protrusions 145 may be formed to correspond to the grooves 135, and formed in both longer side surfaces of the protection circuit board 141.

The protrusions 145 may project toward the holder 130' from parts of edges of both longer side surfaces of the protection circuit board 141.

The protrusion 145 includes first and second supporting surfaces 145a and 145b and a notch 145c which is a space formed between the first and second supporting surfaces 145a and 145b.

A width W4 of the protrusion 145 may be the same as a width W3 of the groove 135.

Also, because the first and second supporting surfaces 145a and 145b can be bent inward toward the notch 145c, even if the width W4 of the protrusion 145 is larger than that of the groove 135, the protrusion 145 can be coupled to the groove 135 with the first and second supporting surfaces 145a and 145b bent inward toward the notch 145c.

However, when the width W4 of the protrusion 145 is too large, the first and second supporting surfaces 145a and 145b can be damaged while being coupled to the groove 135.

Of course, when the width W3 of the groove 135 is larger than that of the protrusion 145, the protrusion 145 may be smoothly coupled to the groove 135.

However, when the width W3 of the groove 135 is too large, the protrusion 145 may be easily moved or separated in response to small impact due to weak coupling force, even though the protrusion 145 is coupled to the groove 135.

As described with reference to Table 1, the width W4 of the inserted protrusion 145 may range from 93 to 109% of that of the groove 135.

Of course, the present invention is not limited to the widths of the groove 135 and the protrusion 145 presented in the present embodiment, which will be changed according to materials and thicknesses of the groove and protrusion.

Figure 3A:
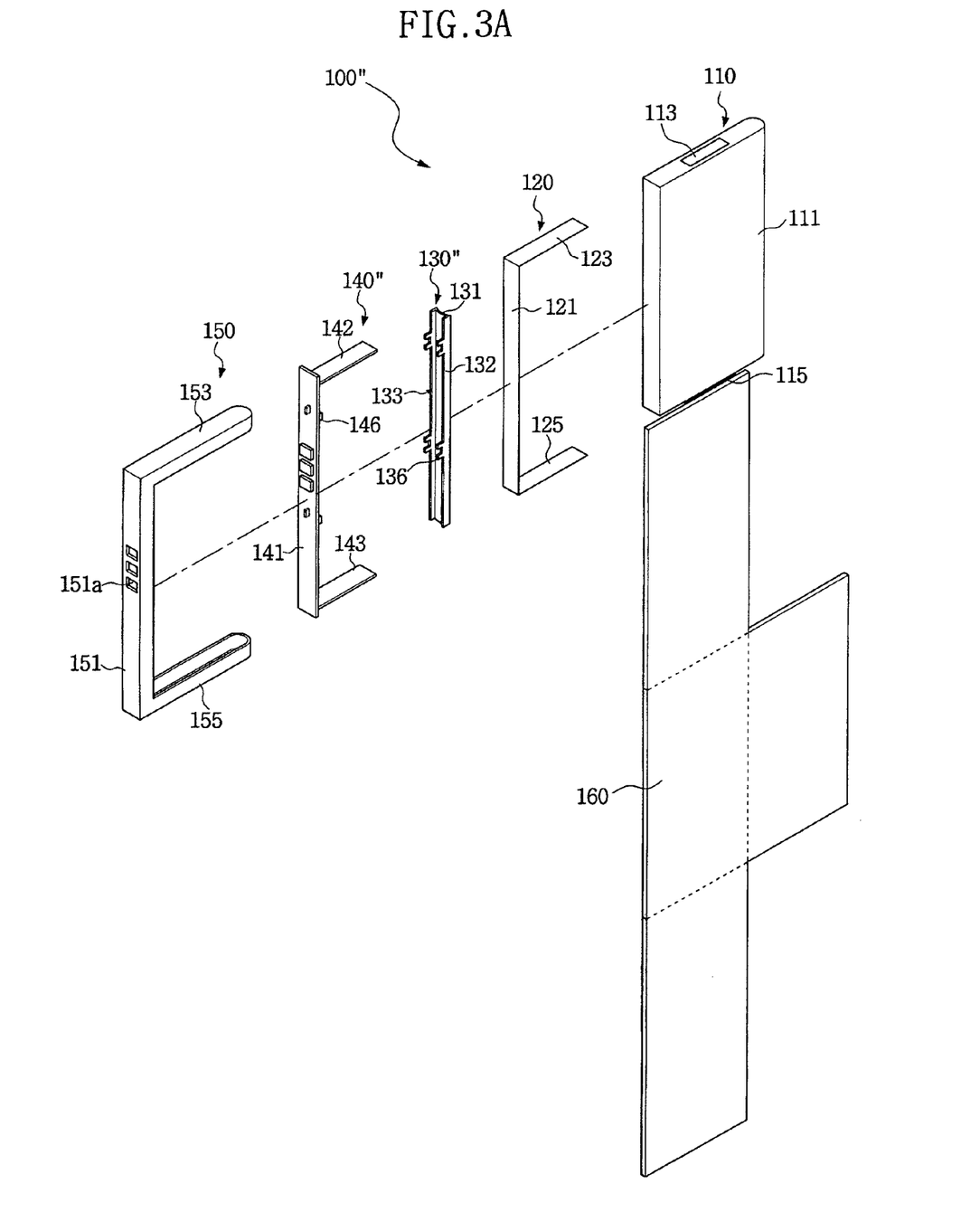
FIG. 3A is an exploded perspective view of a battery pack according to a third exemplary embodiment of the present invention.
Figure 3B:
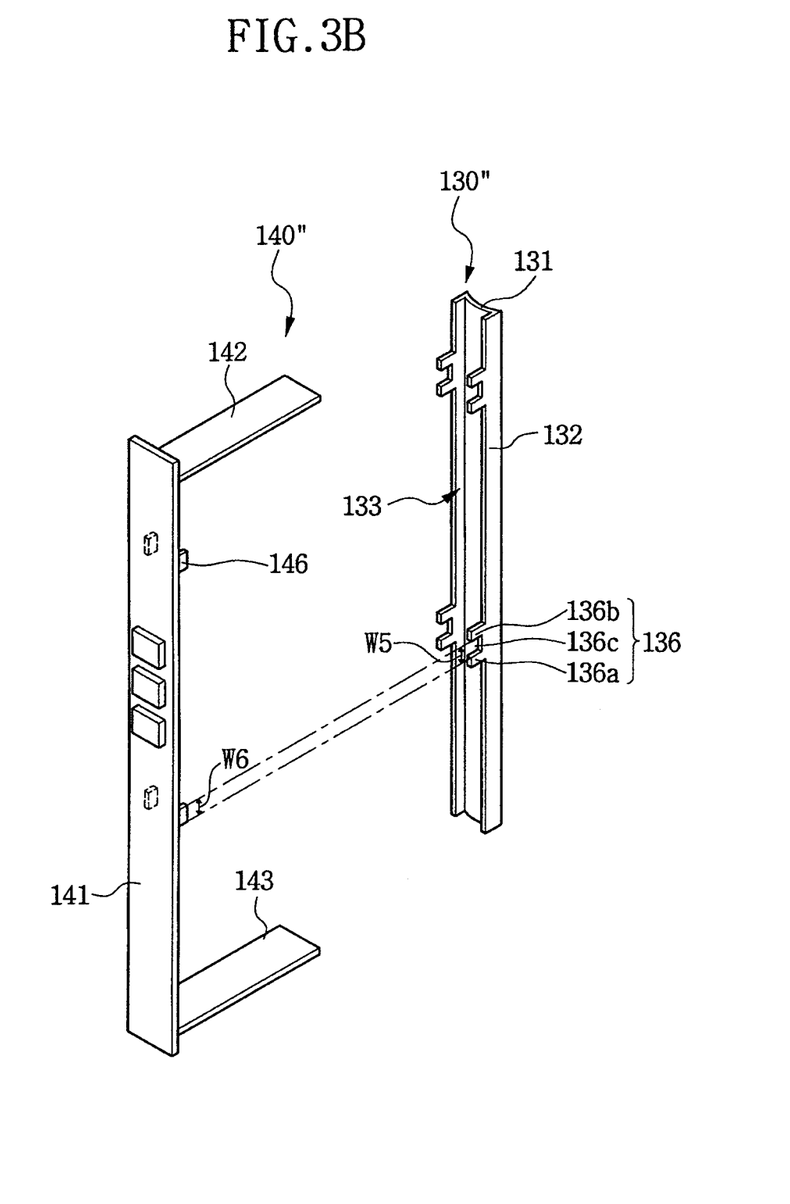
FIG. 3B is a perspective view before coupling a holder to a protection circuit assembly of FIG. 3A.

FIG. 3A is an exploded perspective view of a battery pack according to a third exemplary embodiment of the present invention, and FIG. 3B is a perspective view before coupling a holder with a protection circuit assembly of FIG. 3A.

Referring to FIGS. 3A and 3B, a battery pack 100" according to the third exemplary embodiment of the present invention includes a bare cell 110, a holder 130" and a protection circuit assembly 140".

The battery pack 100" may also include an insulating member 120 disposed between the bare cell 110 and the holder 130", a cover 150 disposed on the protection circuit assembly 140" and a casing 160 for tubing or labeling.

In the battery pack 100" according to the third exemplary embodiment of the present invention, the bare cell 110, the insulating member 120, the cover 150 and the casing 160 have the same configurations and functions as those in the battery pack 100 according to the first exemplary embodiment of the present invention, and thus detailed descriptions thereof will be omitted herein.

The holder 130" may be disposed at one side of the bare cell 110, have a shape in which the protection circuit assembly 140" can be seated, and be formed of plastic.

To be specific, the holder 130" may include a flat seating part 131 disposed at one side of the bare cell 110, supports 132 formed perpendicular to the flat seating part 131 along edges of longer sides thereof, and a holding part 133, which is an empty space surrounded by the flat seating part 131 and the supports 132.

The holder 130" includes at least one first protrusion 136 as a first fastening part, and the first protrusion 136 is coupled to a second protrusion 146 as a second fastening part of the protection circuit assembly 140" to be described later.

The first protrusion 136 may be formed by recessing a part of an end of the support 132.

The first protrusion 136 includes first and second supports 136a and 136b, and a notch 136c which is a space formed between the first and second supports 136a and 136b.

The protection circuit assembly 140" is disposed at one side of the holder 130", and includes a protection circuit board 141 formed by mounting a protection circuit, an electrical device such as a PTC thermistor and an external connection terminal on a printed circuit board, a first lead terminal 142 and a second lead terminal 143.

The first lead terminal 142 and the second lead terminal 143 are electrically connected with the protection circuit board 141.

The first and second lead terminals 142 and 143 have the same functions as those in the first exemplary embodiment of the present invention, and thus detailed descriptions thereof will be omitted herein.

The protection circuit board 141 is coupled to the holder 130", and includes one or more second protrusions 146 as second fastening parts formed to be coupled to the first protrusions 136 of the holder 130".

Thus, the second protrusions 146 are formed to correspond to the first protrusions 136.

The second protrusions 146 may project toward the holder 130" from parts of both longer side surfaces of the protection circuit board 141, and may be formed in a square pillar shape.

The second protrusion 146 is coupled to the notch 136c of the first protrusion 136, and thus a width W6 of the second protrusion 146 may be the same as a width W5 of the notch 136c of the first protrusion 136.

Further, because the first and second supporting surfaces 136a and 136b of the first protrusion 136 can be bent outward from the notch 136c, even if the width W6 of the second protrusion 146 is larger than that of the notch 136c of the first protrusion 136, the second protrusion 146 can be coupled to the notch 136c with the first and second supporting surfaces 136a and 136b bent outward from the notch 136c.

However, when the width W6 of the second protrusion 146 is too large, the first and second supporting surfaces 136a and 136b may be damaged while being coupled to the second protrusion 146.

Of course, when the width W5 of the notch 136c of the first protrusion 136 is larger than that of the second protrusion 146, the second protrusion 146 may be smoothly coupled to the notch 136c.

However, when the width W5 of the notch 136c is too large, the second protrusion 146 may be easily moved or separated in response to small impact due to weak coupling force, even though the second protrusion 146 is coupled to the notch 136c.

Thus, as described with reference to Table 1, the width W6 of the second protrusion 146 may be in a range from 93 to 109% of that of the notch 136c.

Of course, the present invention is not limited to the widths of the second protrusion 146 and the notch 136c presented in the present embodiment, which will be changed according to materials and thicknesses of the first and second protrusions 136 and 146.

A shape of the first protrusion 136 formed at the holder 130" may be adversely formed to that of the second protrusion 146 formed at the protection circuit board 141.

That is, the second protrusion 146 may be formed at the holder 130", and the first protrusion 136 may be formed at the protection circuit board 141.

Figure 4A:
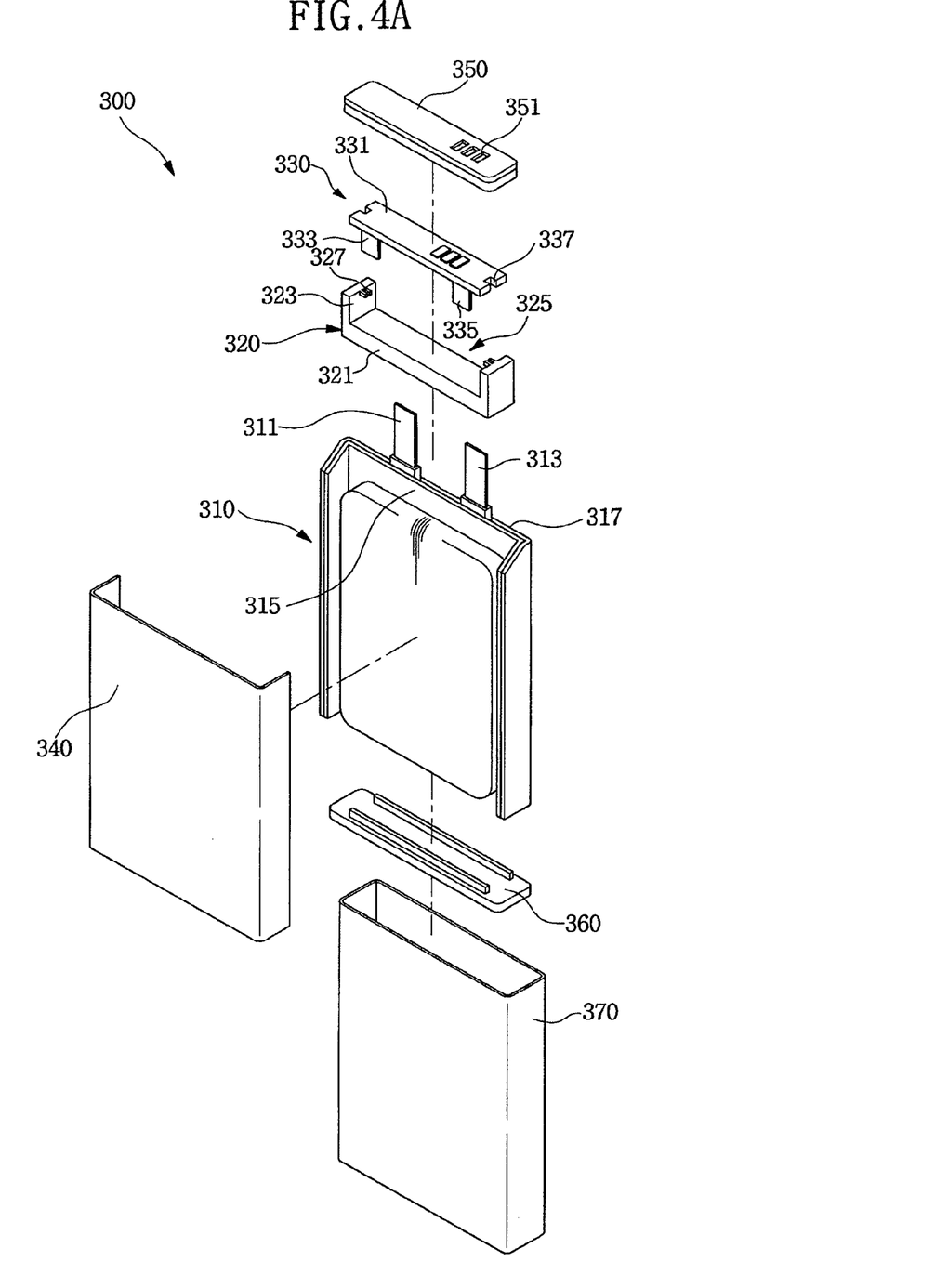
FIG. 4A is an exploded perspective view of a battery pack according to a fourth exemplary embodiment of the present invention.
Figure 4B:
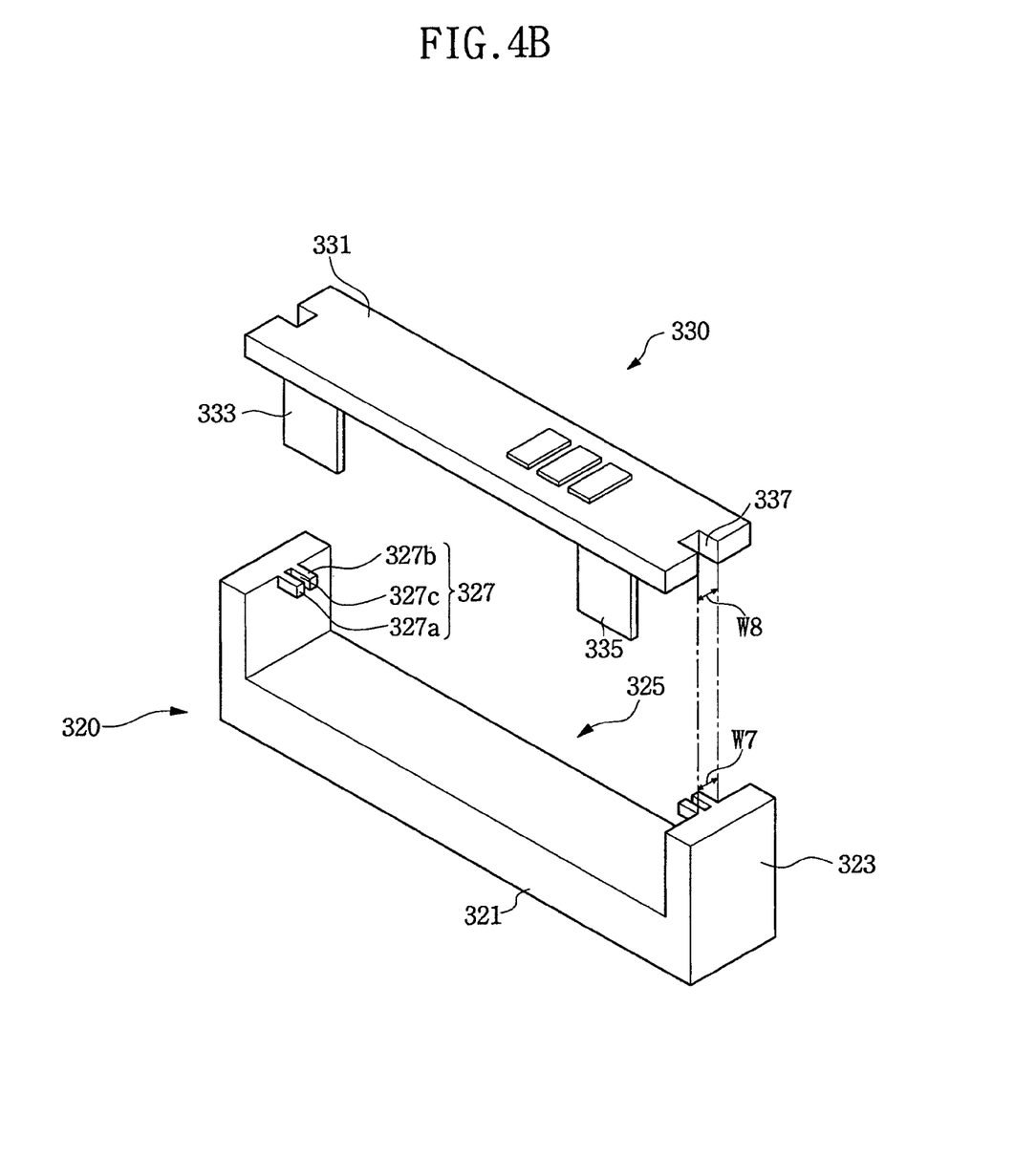
FIG. 4B is a perspective view before coupling a holder to a protection circuit assembly of FIG. 4A.

FIG. 4A is an exploded perspective view of a battery pack according to a fourth exemplary embodiment of the present invention, and FIG. 4B is a perspective view before coupling a holder to a protection circuit assembly of FIG. 4A.

Referring to FIGS. 4A and 4B, a battery pack 300 according to the fourth exemplary embodiment of the present invention includes a bare cell 310, a holder 320 disposed at one side of the bare cell 310 and a protection circuit assembly 330.

The battery pack 300 may also include an outer case 340, a top cover 350 and a bottom cover 360 for forming an exterior and protecting the bare cell 310, the holder 320 and the protection circuit assembly 330 from external impact.

The battery pack 300 may also include a casing 370 for tubing or labeling.

The bare cell 310 includes an electrode assembly having a positive electrode plate, a negative electrode plate and a separator, and the casing 370 accommodating the electrode assembly.

The bare cell 310 also includes a first electrode tab 311 and a second electrode tab 313, which project from one side of the casing to electrically connect the electrode assembly with the outside.

Hereinafter, the first electrode tab 311 is called a positive electrode tab, and the second electrode tab 313 is called a negative electrode tab.

The one side of the casing from which the first and second electrode tabs 311 and 313 project is called a top surface of the bare cell 310.

The casing may be formed in a pouch shape, and include a lower casing 315 accommodating the electrode assembly and an upper casing 317 covering the lower casing 315.

The bare cell 310 is formed by joining edges of the lower and upper casings 315 and 317.

The holder 320 is disposed on the top surface of the bare cell 310, and maintains a distance between the bare cell 310 and the protection circuit assembly 330.

The holder 320 may also have a shape in which the protection circuit assembly 330 can be seated, and may be formed of plastic.

To be specific, the holder 320 includes a flat seating part 321 disposed on the top surface of the bare cell 110, supports 323 formed perpendicular to edges of short sides of the flat seating part 321, and a holding part 325 which is an empty space surrounded by the flat seating part 321 and the supports 323.

The holder 320 also includes at least one protrusion 327 as a first fastening part, and the protrusion 327 is coupled to an opening or groove 337 as a second fastening part of the protection circuit assembly 330 to be described later.

The protrusion 327 may project toward the holding part 325 from a part of the support 323.

The protrusion 327 includes first and second supporting surfaces 327a and 327b, and a notch 327c which is a space formed between the first and second supporting surfaces 327a and 327b.

The protection circuit assembly 330 is disposed at one side of the holder 320, and includes a protection circuit board 331, and first and second lead terminals 333 and 335 electrically connected with the protection circuit board 331.

The protection circuit board 331 is formed by mounting a protection circuit, an electrical device such as a PTC thermistor and an external connection terminal on a printed circuit board.

The protection circuit board 331 is connected with the holder 320, and includes at least one groove 337 as a second fastening part formed to be coupled to the protrusion 327 of the holder 320.

Thus, the grooves 337 may be formed to correspond to the protrusions 327, and formed in short side surfaces of the protection circuit board 330.

Here, a width W7 of the protrusion 327 may be the same as a width W8 of the groove 337.

Further, because the first and second supporting surfaces 327a and 327b can be bent inward toward the notch 327c, even if the width W7 of the protrusion 327 is larger than that of the groove 337, the protrusion 327 can be coupled to the groove 337 with the first and second supporting surfaces 327a and 327b bent inward toward the notch 327c.

However, when the width W7 of the protrusion 327 is too large, the first and second supporting surfaces 327a and 327b may be damaged while being coupled to the groove 337.

Of course, when the width W8 of the groove 337 is larger than that of the protrusion 327, the protrusion 327 may be smoothly coupled to the groove 337.

However, when the width W8 of the groove 337 is too large, the protrusion 327 may be easily moved or separated in response to small impact due to weak coupling force, even though the protrusion 327 is coupled to the groove 337.

Thus, as described with reference to Table 1, the width W7 of the inserted protrusion 327 may range from 93 to 109% of the width W8 of the groove 337.

Of course, the present invention is not limited to the widths of the protrusion 327 and the groove 337 presented in the present embodiment, which will be changed according to materials and thicknesses of the protrusion 327 and the groove 337.

The first and second lead terminals 333 and 335 are provided to electrically connect the bare cell 310 with the protection circuit board 331.

The first lead terminal 333 is connected with the positive electrode tab 311 of the bare cell 310, and the second lead terminal 335 is connected with the negative electrode tab 313 of the bare cell 310.

The external case 340 is coupled to a side surface of the bare cell 310 to prevent damage of the bare cell 310, and may be formed of stainless steel or aluminum.

The top cover 350 covers a top surface of the protection circuit board 331, and includes a terminal hole 351 for exposing an external connection terminal formed on the protection circuit board 331 to the outside.

The casing 370 may be a tape-shaped label or a heat shrinkable tube attached to cover side and bottom surfaces of the bare cell 110.

In the fourth exemplary embodiment of the present invention with reference to FIGS. 4A and 4B, the protrusion 327, a first fastening part, is formed on the holder 320, and the groove 337, a second fastening part, is formed in the protection circuit board 331.

Contrarily, however, the groove, the first fastening part, may be formed in the holder, and the protrusion, the second fastening part, may be formed on the protection circuit board.

Here, the groove may be formed in the support of the holder, and the protrusion may be formed in both shorter side surfaces of the protection circuit board.

Figure 5A:
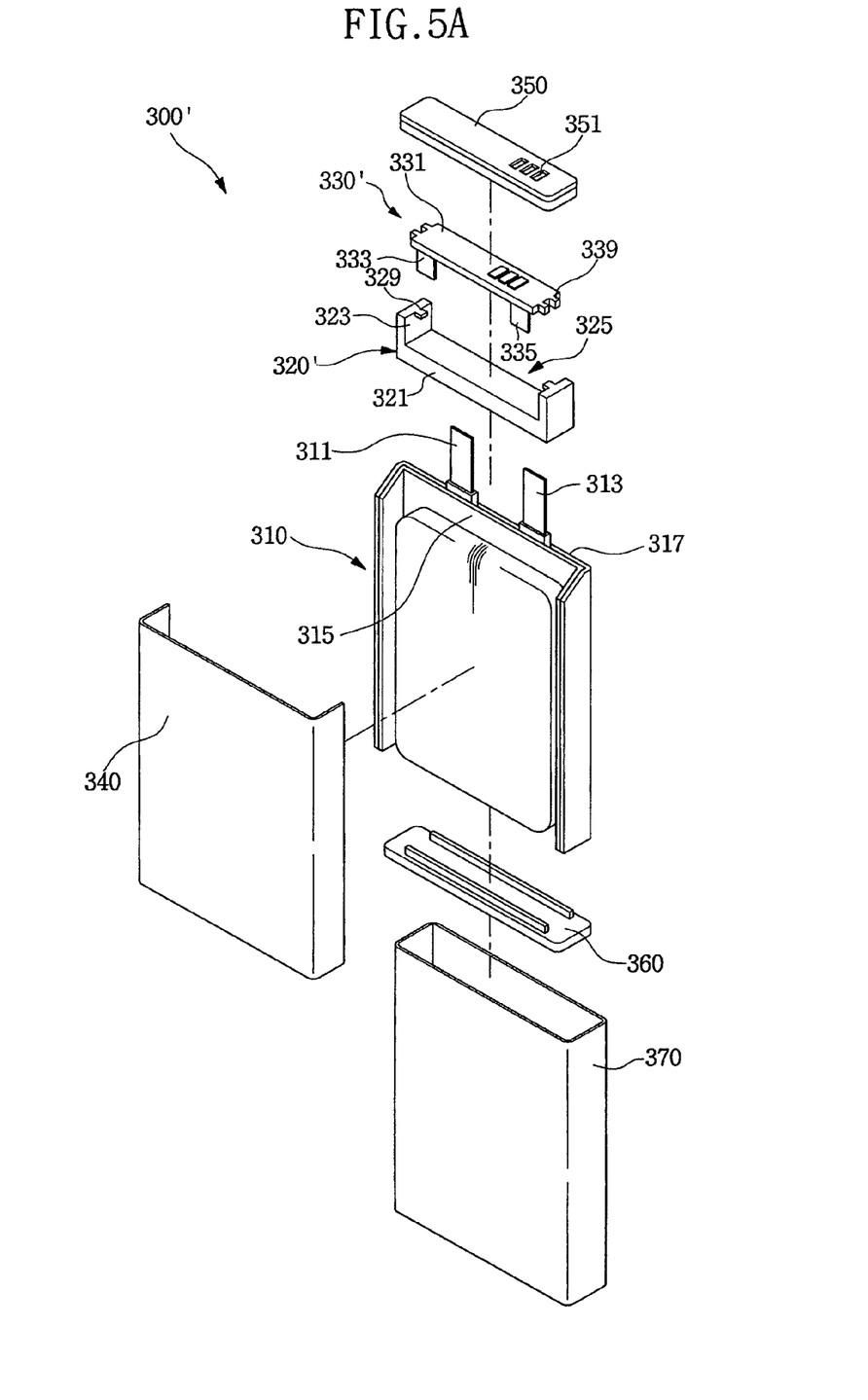
FIG. 5A is an exploded perspective view of a battery pack according to a fifth exemplary embodiment of the present invention.
Figure 5B:
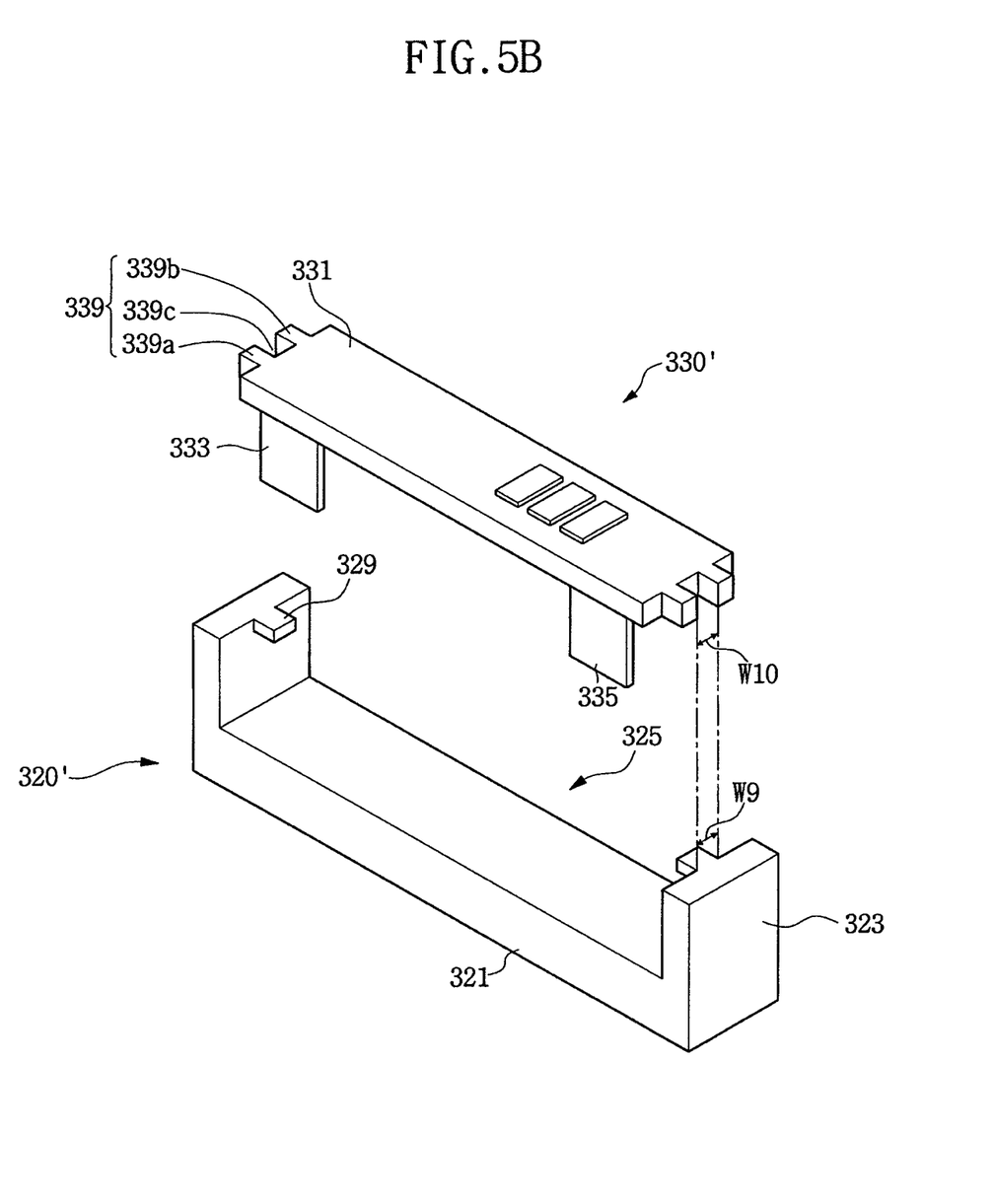
FIG. 5B is a perspective view before coupling a holder to a protection circuit assembly of FIG. 5A.

FIG. 5A is an exploded perspective view of a battery pack according to a fifth exemplary embodiment of the present invention, and FIG. 5B is an exploded perspective view of a holder and a protection circuit assembly of FIG. 5A.

Referring to FIGS. 5A and 5B, a battery pack 300' according to the fifth exemplary embodiment of the present invention includes a bare cell 310, and a holder 320' and a protection circuit assembly 330', which are disposed at one side of the bare cell 310.

The battery pack 300' may further include an external case 340, a top cover 350 and a bottom cover 360 for forming an exterior and protecting the bare cell 310, the holder 320' and the protection circuit assembly 330' from external impact.

The battery pack 300' may further include a casing 370 for tubing or labeling.

In the battery pack 300' according to the fifth exemplary embodiment of the present invention, the bare cell 310, the external case 340, the top cover 350, the bottom cover 360 and the casing 370 have the same configurations and functions as those in the battery pack 300 according to the fourth exemplary embodiment of the present invention, and thus detailed descriptions thereof will be omitted herein.

The holder 320' may be disposed on a top surface of the bare cell 310, have a shape in which the protection circuit assembly 140' can be seated 330', and be formed of plastic.

To be specific, the holder 320' may include a flat seating part 321 disposed at one side of the bare cell 310, supports 323 formed perpendicular to the flat seating part 321 along edges of shorter sides thereof, and a holding part 325, which is an empty space surrounded by the flat seating part 321 and the supports 323.

The holder 320' includes at least one first protrusion 329, a first fastening part, and the first protrusion 329 is coupled to a second protrusion 339, a second fastening part, of the protection circuit assembly 330' to be described later.

The first protrusion 329 may project toward the holding part 325 from a part of an inner side surface of the support 323, and may be formed in a square pillar shape.

The protection circuit assembly 330' is disposed at one side of the holder 320', and includes a protection circuit board 331, and first and second lead terminals 333 and 335 electrically connected with the protection circuit board 331.

The protection circuit board 331 is formed by mounting a protection circuit, an electrical device such as a PTC thermistor and an external connection terminal on a printed circuit board.

The protection circuit board 331 is coupled to the holder 320', and includes at least one second protrusion 339, the second fastening part, formed to be coupled to the first fastening part 329 of the holder 320'.

The second protrusion 339 includes first and second supporting surfaces 339a and 339b, and a notch 339c which is a space formed between the first and second supporting surfaces 339a and 339b.

The first protrusion 329 is coupled to the notch 339c of the second protrusion 339, and thus a width W9 of the first protrusion 329 may be the same as a width W10 of the notch 339c.

Further, because the first and second supporting surfaces 339a and 339b of the second protrusion 339 can be bent outward from the notch 339c, even if the width W9 of the first protrusion 329 is larger than that of the notch 339c of the second protrusion 339, the first protrusion 329 can be coupled to the notch 339c with the first and second supporting surfaces 339a and 339b bent outward from the notch 339c.

However, when the width W9 of the first protrusion 329 is too large, the first and second supporting surfaces 339a and 339b may be damaged while being coupled to the first protrusion 329.

Of course, when the width W10 of the notch 339c of the second protrusion 339 is larger than that of the first protrusion 329, the first protrusion 329 may be smoothly coupled to the notch 339c.

However, when the width W10 of the notch 339c of the second protrusion 339 is too large, the first protrusion 329 can be easily moved or separated in response to small impact due to weak coupling force, even though the first protrusion 329 is coupled to the notch 339c of the second protrusion 339.

Thus, as described with reference to Table 1, the width W9 of the first protrusion 329 may range from 93 to 109% of that of the notch 339c of the second protrusion 339.

Of course, the present invention is not limited to the widths of the first protrusion 329 and the notch 339c of the second protrusion 339 presented in the present embodiment, which will be changed according to materials and thicknesses of the first and second protrusions 329 and 339.

The first and second lead terminals 333 and 335 are provided to electrically connect the bare cell 310 with the protection circuit board 331.

The first lead terminal 333 is connected with a positive electrode tab 311 of the bare cell 310, and the second lead terminal 335 is connected with a negative electrode tab 313 of the bare cell 310.

In the fifth exemplary embodiment of the present invention with reference to FIGS. 5A and 5B, the first protrusion 329, the first fastening part, is formed on the holder 320', and the second protrusion 339, the second fastening part, is formed on the protection circuit board 331.

Contrarily, however, the first protrusion, the first fastening part, may be formed on the protection circuit board, and the second protrusion, the second fastening part, may be formed on the holder.

Here, the first protrusions may be formed in both shorter side surfaces of the protection circuit board, and the second protrusion may project toward the holding part from an inner side surface of the support of the holder.

According to the present invention, a battery pack can improve coupling force between a holder and a protection circuit board, which can be coupled due to a flexible protrusion even if a process deviation is made. Thus, the battery pack can improve processability and productivity.

Although a few embodiments of the present invention have been shown and described, it will be appreciated by those skilled in the art that changes may be made in this embodiment without departing from the principles and spirit of the invention, the scope of which is defined in the claims and their equivalents.

What is claimed is:

1. A battery pack, comprising:
a bare cell;
a holder disposed on a first side of the bare cell, the holder including a first fastening part; and
a protection circuit assembly disposed on the holder, the protection circuit assembly includes a second fastening part coupled to the first fastening part; and
a cover disposed on the protection circuit assembly,
wherein one of the first and second fastening parts is a protrusion and the other is a groove, and the protrusion includes a first supporting surface, a second supporting surface and a notch formed between the first and second supporting surfaces wherein the first and second supporting surfaces bend inward into the notch when positioned in the groove.

2. The battery pack according to claim 1, wherein the protrusion is coupled to the groove.

3. The battery pack according to claim 1, wherein a width of the protrusion ranges from 93 to 109% of that of the groove.

4. The battery pack according to claim 3, wherein the width of the protrusion ranges from 0.91 to 1.07 mm.

5. The battery pack according to claim 1, wherein a width of the protrusion is larger than that of the groove.

6. The battery pack according to claim 1, wherein the bare cell is formed in a prismatic shape or a pillar shape having rounded corners.

7. The battery pack according to claim 1, wherein the bare cell is formed in a pouch type.

8. The battery pack according to claim 6, wherein the holder includes a flat seating part having longer sides and shorter sides disposed at one side of the bare cell, supports formed perpendicular to the flat seating part along edges of longer sides of the flat seating part, and a holding part surrounded by the flat seating part and the supports, and the first fastening part is formed at an end of the support.

9. The battery pack according to claim 7, wherein the holder includes a flat seating part having longer sides and shorter sides disposed at one side of the bare cell, supports formed perpendicular to the flat seating part along edges of shorter sides of the flat seating part, and a holding part surrounded by the flat seating part and the supports, and the first fastening part is formed at an inner side surface of the support.

10. The battery pack according to claim 8, wherein the protection circuit assembly includes a protection circuit board having two longer sides and two shorter sides coupled to the holder, and the second fastening parts are formed at both longer sides of the protection circuit board.

11. The battery pack according to claim 9, wherein the protection circuit assembly includes a protection circuit board having two longer side and two shorter sides coupled to the holder, and the second fastening parts are formed at both shorter sides of the protection circuit board.

12. A battery pack, comprising:
a bare cell, protection circuit assembly having a protection circuit board disposed on a first side of the bare cell, and a holder disposed between the first side of the bare cell and the protection circuit board of the protection circuit assembly,
wherein the holder includes a first fastening part, and the protection circuit board includes a second fastening part,
wherein one of the first and second fastening parts is a protrusion including a first supporting surface, a second supporting surface and a notch formed between the first and second supporting surfaces wherein the first and second supporting surfaces bend inward into the notch when positioned in the groove.

13. The battery pack according to claim 12, wherein the other of the first and second fastening parts is a groove, and the protrusion is inserted into the groove.

14. The battery pack according to claim 12, wherein the other of the first and second fastening parts is formed in the shape of a square pillar, and the square pillar is inserted into the notch.

* * * * *